US009032400B1

(12) United States Patent
Thomas et al.

(10) Patent No.: US 9,032,400 B1
(45) Date of Patent: May 12, 2015

(54) OPPORTUNISTIC INITIATION OF POTENTIALLY INVASIVE ACTIONS (71) Applicant: Amazon Technologies, Inc., Reno, NV (US)

(72) Inventors: Nathan Thomas, Seattle, WA (US); James Alfred Gordon Greenfield, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 107 days.

(21) Appl. No.: 13/660,668

(22) Filed: Oct. 25, 2012

(51) Int. Cl.
G06F 9/455 (2006.01)
G06F 11/00 (2006.01)

(52) U.S. Cl.
CPC .................................. G06F 11/008 (2013.01)

(58) Field of Classification Search
None
See application file for complete search history.

(56) References Cited

U.S. PATENT DOCUMENTS

| 7,299,468 | B2 * | 11/2007 | Casey et al. | 718/104 |
|---|---|---|---|---|
| 8,332,571 | B1 * | 12/2012 | Edwards, Sr. | 711/6 |
| 2007/0174429 | A1 * | 7/2007 | Mazzaferri et al. | 709/218 |
| 2009/0100420 | A1 * | 4/2009 | Sapuntzakis et al. | 717/171 |
| 2009/0182929 | A1 * | 7/2009 | Hwang et al. | 711/6 |
| 2010/0043073 | A1 * | 2/2010 | Kuwamura | 726/24 |
| 2010/0106885 | A1 * | 4/2010 | Gao et al. | 711/6 |
| 2011/0099267 | A1 * | 4/2011 | Suri et al. | 709/224 |
| 2012/0030669 | A1 * | 2/2012 | Tsirkin | 718/1 |
| 2012/0030670 | A1 * | 2/2012 | Vijay et al. | 718/1 |
| 2013/0179289 | A1 * | 7/2013 | Calder et al. | 705/26.3 |
| 2013/0263117 | A1 * | 10/2013 | Konik et al. | 718/1 |
| 2014/0026133 | A1 * | 1/2014 | Parker | 718/1 |
| 2014/0053151 | A1 * | 2/2014 | Heninger et al. | 718/1 |

* cited by examiner

Primary Examiner — Adam Lee
(74) Attorney, Agent, or Firm — Lee & Hayes, PLLC (57) ABSTRACT A system and method for opportunistically initiating potentially invasive actions on a computer system hosting virtual machine instances is described. When a specific state of operation of the VMI or computing service is detected, such as inactivity, an action, such as a reboot, kernel update, or other potentially invasive action can be performed on the software and/or hardware supporting the VMI. In addition to the foregoing, other aspects are described in the claims, detailed description, and figures.

28 Claims, 4 Drawing Sheets

OPPORTUNISTIC INITIATION OF POTENTIALLY INVASIVE ACTIONS

BACKGROUND

Large-scale, network-based computing represents a paradigm shift from traditional client-server computing relationships. With large-scale, network-based computing platforms (e.g., data centers), customers are able to leverage shared resources on-demand by renting resources that are owned by third parties and that reside "in the cloud." With these resources, customers of the platform are able to launch and maintain large applications without actually owning or servicing the underlying infrastructure necessary for these applications. As such, network-accessible computing platforms, often referred to as "cloud-computing platforms" or "cloud-computing environments," have expanded the class of individuals and companies able to effectively compete in the realm of computing applications.

Generally, customers of a network-based computing platform run large applications within the network-based computing platform through the use of one or more virtual machine instances (VMI). VMIs can be created by the network-based computing platform in response to requests from customers. Some customer use-cases may require VMIs to have near 100% uptime, and thus, malfunctions or failures of the underlying computer servers used to host VMIs may have serious repercussions to these customers.

However, just like the hardware and software on personal computers, the hardware and/or software on the servers that run VMIs on behalf of customers need to be updated and maintained. Typically, this is accomplished through taking significant and invasive actions which can affect the VMI; however, this causes a problem when a customer's VMI may be in continual use and the service provider has made guarantees around availability.

DETAILED DESCRIPTION

This disclosure generally describes a system and method for opportunistically performing a potentially invasive action on a computer system configured to host virtual machine instances instead of initiating the action at a time where the likelihood of disrupting operation of certain VMIs is high. In an embodiment, a VMI manager that is resident on the computer system, and which selectively provides one or more VMIs, can be configured to execute a potentially invasive action based at least in part on the state of the VMIs it is hosting. For example, a VMI manager can receive a request to initiate an action (e.g., a request to install software or a request to reboot) that may disrupt the operation of the VMIs it is hosting. Instead of immediately initiating the action, the VMI manager can monitor the operation the VMIs and effect one or more potentially invasive actions opportunistically, such as when the initiation of the action will most likely have a minimal effect on the VMIs.

In an example embodiment, the VMI manager can use the state of at least one VMI, priority information associated with the action, priority information associated with the server, etc., to determine when to initiate the action. For example, the VMI manager can be configured to use information that indicates the operational states of VMIs (e.g., idle, shutting down, restarting, etc.) to determine whether a potentially invasive action can be initiated. In the same or an alternative embodiment, the VMI manager may use state information for a subset of the VMIs it is hosting. For example, the VMI manager can be configured to opportunistically initiate an action based on state information associated with high priority VMI. For example, the VMI manager can have access to priority ratings that indicate whether the VMIs have interruptible or uninterruptable levels of service. In this example embodiment, the VMI manager may effect potentially invasive actions opportunistically based on the state of VMIs with uninterruptable levels of service (i.e., the VMI manager may not consider VMIs with non-guaranteed levels of service in its analysis). As is further described herein, the potentially invasive action can be any action that could potentially negatively affect operation of hosted VMIs. Examples of potentially invasive actions include actions such as a server reboot, installation of software such as a patch or an update to the software in the VMI manager that affects or is likely to affect operation of the server (e.g., the software such as hardware drivers, virtualization components, kernel components, etc.), maintenance or modification of the hardware of the server, or storage and retrieval of virtual machines into and from storage.

Figure 1:
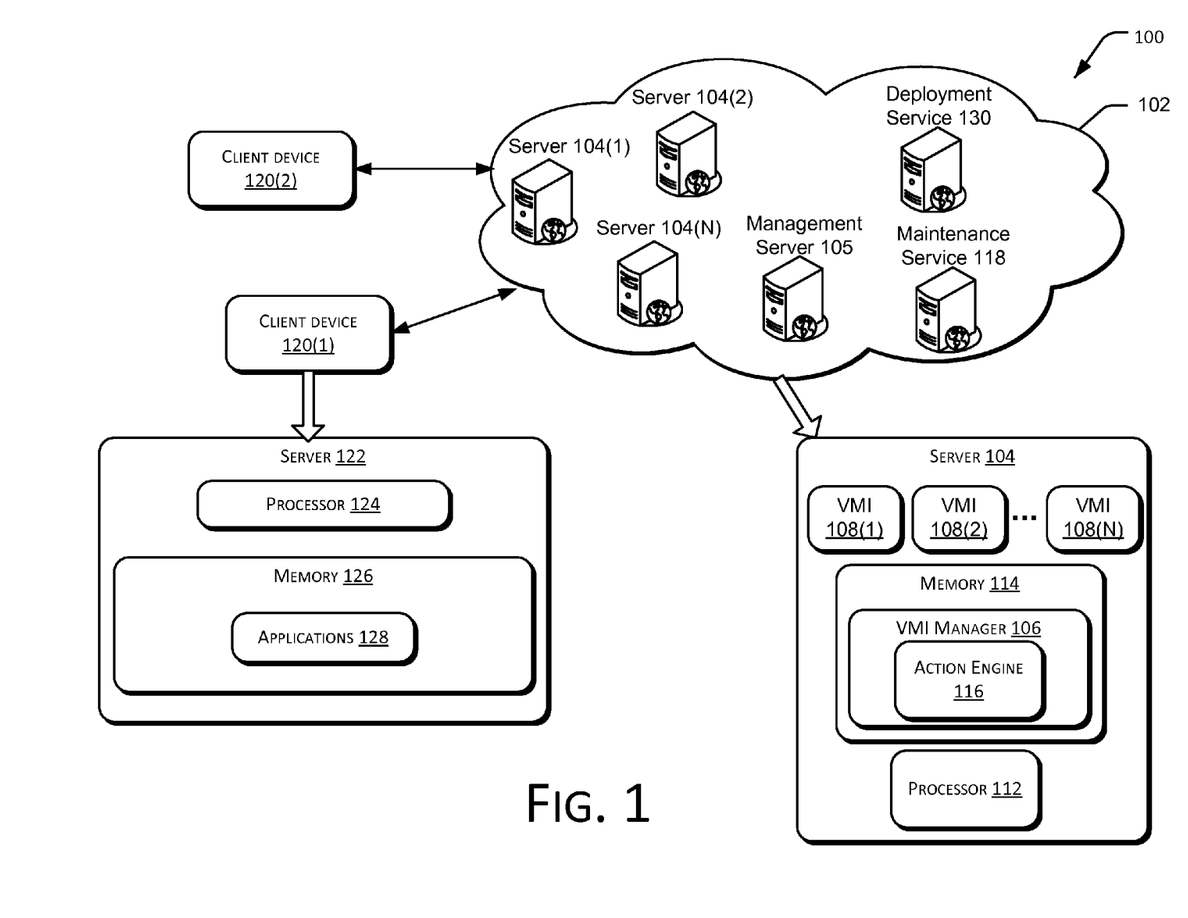
FIG. 1 illustrates an example of a computing environment in which VMIs are uploaded to a network-accessible computing platform and provided to a client device.

Turning now to FIG. 1, it illustrates an environment 100 for instantiating VMIs utilizing a cloud-based environment. The environment of FIG. 1 includes a network-accessible computing platform or services provider environment 102 that provides network-accessible computing services via a network of computing devices represented as one or more servers 104(1), 104(2), . . . , 104(N), which may include both resources and functionalities. The computing devices available to provide computing services within the service provider environment 102 may be in the form of dedicated servers, shared servers, and so forth. While FIG. 1 illustrates the computing devices in the form of servers 104, this is not meant to be limiting and is presented as such simply for ease and clarity. As illustrated, each of the servers 104 may include a VMI manager 106, that can create one or more virtual machine instances (VMI) 108(1), 108(2), . . . 108(N) for sharing resources of the server 104, if creation of the one or more virtual machine instances 108 is needed.

In addition, FIG. 1 illustrates an action engine (AE) 116 that, in embodiments of the disclosure, can opportunistically initiate potentially invasive actions to reduce the impact on hosted VMIs. For example, and described in more detail elsewhere, the management server 105 may send a message to the VMI manager 106 indicating that an invasive or disruptive action can or should be initiated. In a specific example, the message may indicate that a software update is available for the VMI manager 106. In response, the message can be routed to the AE 116 and the AE 116 can process the message and prepare the system to opportunistically initiate the action. For example, the AE 116 can determine whether installation of the software update would disrupt running VMIs by determining whether the software update would require the server 104 to reboot or if the software update requires components to be disabled (e.g., virtualization components that, if disabled, would disrupt the operation of the VMIs). Supposing that the action would most likely impact operation of at least a portion of the VMIs, the AE 116 can monitor the state of some or all of the VMIs and initiate the action when the VMIs are in a state where initiation of the action will have a lower chance of impacting the VMIs performance.

Turning back to the general overview of FIG. 1, each of the servers 104 also generally includes one or more processors 112 and memory 114, which may comprise any sort of computer-readable storage media and may store one or more applications as well as the VMI manager 106. The servers may also include one or more other components typically found in computing devices, such as communication connections, input/output I/O interfaces, and the like. VMI manager 106 or any other software management layers can be uniformly executed in the same program space on the same server 104, or can be broken out individually based upon functionality and the programs can be resident on several servers.

Also illustrated are control plane services such as maintenance services 118 and deployment services 130. In addition to these two services, the service provider environment 102 can have other management services. In general, the control plane services can monitor the operations of the other servers 104 and can determine when an invasive action is available. As is further described herein, the control plane services can control the invasive actions on the software or the hardware of the servers 104 by directing the VMI manager 106 to initiate such a workflow or can direct the servers 104 to perform the action at the requisite predetermined operational state.

The system and method accordingly provide the ability for a VMI manger 106 to initiate the invasive action at an opportune time, such that the impact to hosted VMIs may be minimal. Moreover, the functionality can be implemented completely at the server 104 such that the invasive action can occur off the network without any instruction from the management server 105.

As shown in the figure, in an embodiment the control plane services can include maintenance service 118 as well as a deployment service 130. In one embodiment, the maintenance service 118 will create work tickets for data center technicians to perform physical maintenance or other actions on the servers 104. Some of this work will need to be done when the server 104 is providing a network-accessible resource, such as a VMI. Thus, when a work ticket is created for a server, e.g. server 104(1) in FIG. 1, the maintenance service 118 can instruct server 104(1) to opportunistically power down for maintenance. Before powering down, the server 104(1) can signal the maintenance service 118 that the required physical work can be done. One or more client devices 120(1), 120(2), . . . , 120(N) communicate and interact with the service provider environment 102 in order to obtain computing services. The client devices 120 communicate with the network-accessible computing platform 102 via a network, such as, for example, the Internet and communication connections and I/O interfaces. Generally, the computing services from the network-accessible computing platform 102 are available to the client devices 120 in scalable increments or amounts, which can be dynamically increased or decreased in response to usage and/or demand. Service fees may be tied to the amount of the resources that are actually used.

Generally, the client devices 120 are in the form of one or more servers 122. However, this is not meant to be limiting and it is presented as such for ease and clarity. Similar to the network-accessible computing platform 102, each of the one or more servers 122 that make up a client device 120 generally includes one or more processors 124 and memory 126. The memory 126 generally has stored therein one or more applications 128.

The computing services available from the network-accessible computing platform 102 may include functional elements or services, comprising VMIs or other computations resources. Functional elements or services may comprise applications or sub-applications that are used as building blocks for client device applications. For example, the service provider environment 102 may provide predefined database functionality in the form of a discrete service that can be instantiated on behalf of a client device. Functional components may relate to network communications and other services or activities. Network-related services may, for example, include firewalls, load balancers, filters, routers, and so forth. Additional functional components may be available for such things as graphics processing, language translation, searching, etc.

The computing services may also be characterized by service types or categories, such as by the types or categories of services they provide. Different types or categories of services may include database services, web servers, firewalls, file replicators, storage services, encryption services, authentication services, and so forth. In some embodiments, services may be categorized at a relatively high level. For example, a "database services" category may include various different implementations of database services. In other embodiments, services may be categorized more specifically or narrowly, such as by type or family of database services. In embodiments such as this, for example, there may be different categories for relational databases services and non-relational database services, and for SQL and other implementations of databases services.

Service parameters for the computing services provided by the service provider environment 102 may correspond to options, configuration details, availability, speeds, capacities, variations, quality-of-service (QoS) assurances/guaranties, and so forth made to the customer utilizing the services. In the example of a database service, the service parameters may indicate the type of database (relational vs. non-relational, SQL vs. Oracle, etc.), its capacity, its version number, its cost or cost metrics, its network communication parameters, and so forth. Consequently, the level of service guaranteed to the customer for the computing service, such as a certain number of VMIs being operational at any one time, such criteria can dictate the performance of an invasive action such that the guaranteed service level is maintained.

Figure 2:
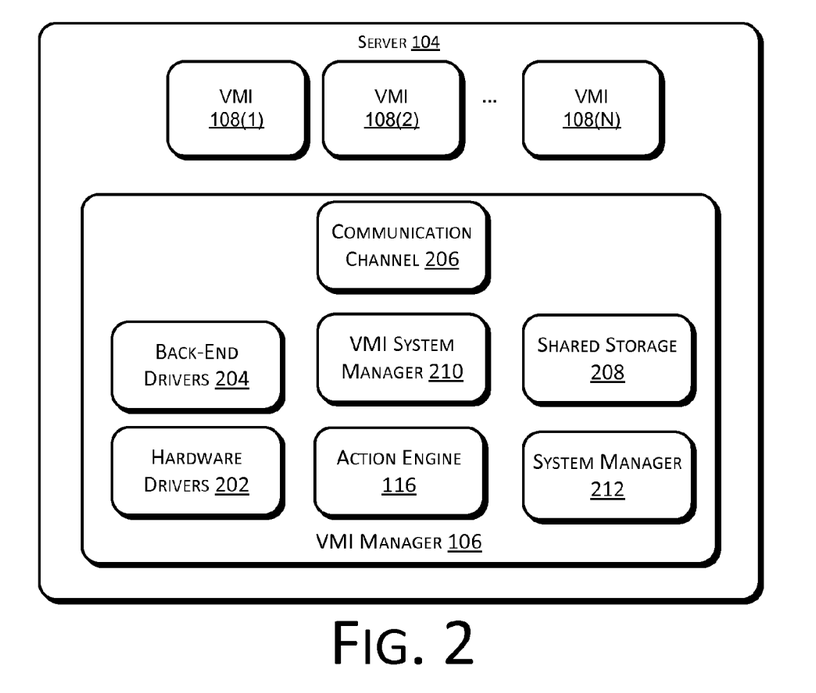
FIG. 2 illustrates an example of a series of servers in a data center servicing a plurality of VMIs.

With reference to FIG. 2, the present system, in one embodiment, instantiates the VMIs 108(N) such that VMIs can be monitored by control plane services operating within the service provider environment 102 that selectively provides one or more VMIs that are each accessible to one or more client devices 120 across a network. As shown by the figure, the VMIs can be resident on one or more servers 104, hosted by a VMI manager 106 that can include various components, such as the example components illustrated in the figure. A VMI manager 106 resident on or accessible to the computer hardware that, at least, maintains the operation of the one or more VMIs. the VMI manager 106 can instantiate each VMI 108(N) such that the VMI includes the ability to assist in the monitoring of that VMI's own operational states, or all these monitoring actions can be done at the VMI manager 106 as is further described herein. As described above, in some cases an invasive action can involve the software running within the VMI manager 106. For example, a software patch to code in the VMI manager 106 could cause the VMI manager 106 or a component within the VMI manager 106 to restart. Thus, in embodiments the VMI manager 106, e.g., the AE 116, can be configured to determine if the action will have an impact on software that effectuates the VMIs and delay initiation of the action until an opportune time.

FIG. 2 illustrates example components that could affect operation of a VMI. For example, the VMI manager 106 can include various components that control the hardware of server 104 and provide virtualization services, such as CPU scheduling and memory partitioning for the VMIs. Thus, if at least one of these components needs to be disabled to complete the action the VMI manager 106 can determine to invoke the action when the state of the VMIs indicate that the impact on the VMIs will be minimal. For example, FIG. 2 shows that the VMI manager 106 can include hardware drivers 202 that control hardware of server 104 as well as back-end drivers 204. The back-end drivers are configured to interface with front-end drivers (not shown) running within each VMI to handle input/output operations on behalf of the VMIs. Also shown is a VMI system manager 210, which performs certain system management functions that relate to virtual machines (e.g., it can control virtualized resources exposed to VMIs), and shared storage 208, which can be used by the VMI manager 106 to pass information such as configuration and status information to VMIs. Finally, FIG. 2 shows a system manager 212, which can include management software that enables the VMI manager 106 to communicate with other devices within the service provider environment 102, such as control plane services, such as through a communication channel 206.

In embodiments of the disclosure, in response to a determination that a potentially disruptive action should be taken, such as if a notice from a maintenance service 118 indicating that physical work has to be performed on the supporting servers has been received, the VMI manager 106 (e.g., the AE 116) can determine when to initiate the action. Such determination can be made by the VMI manager 106 by simply determining the current state of the VMIs, and implement the invasive action opportunistically.

Figure 3:
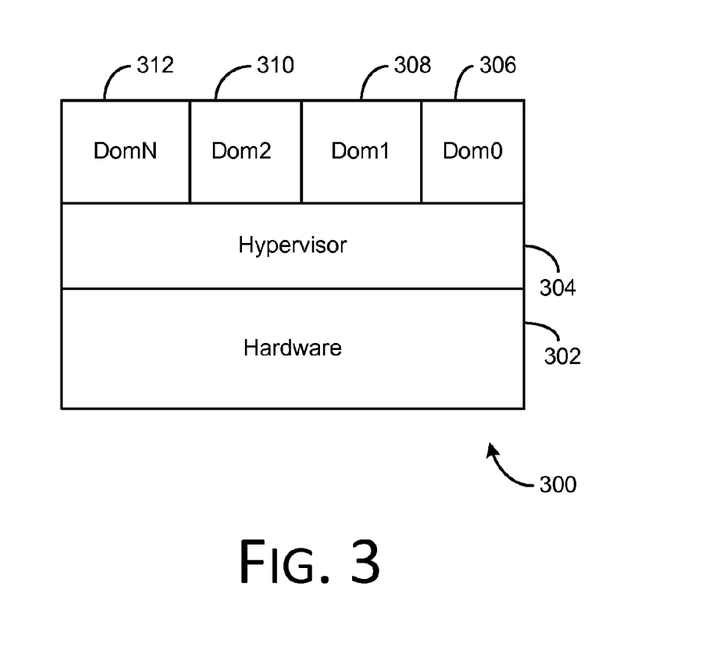
FIG. 3 is a block diagram illustrating one embodiment of a server hosting a plurality of VMI domains.

Referring to FIG. 3, it illustrates a specific embodiment of a VMI manager 106 implemented as two components: a hypervisor 304 and Dom0 306. Here, the hypervisor 304 and Dom0 operate in conjunction to effectuate VMIs. For example, the functions of memory partitioning, memory management access, and CPU scheduling can be performed by the hypervisor. In this configuration, Dom0 306 is typically a special privileged domain that serves as an administrative interface to the hypervisor 30, and implements some of the functionality that otherwise would be a function of the hypervisor 304 such as by running back-end drivers, management software, establishing channels between the back-end drivers and front-end drivers in VMIs, etc.

The hypervisor 304 is one of many hardware virtualization techniques allowing multiple virtual operating systems to run concurrently on a host computer, such as server 300. The hypervisor 304 is conceptually one level higher than a supervisory program, such a native OS would be on the hardware 302. The hypervisor presents to the domains, Dom1 308-DomN 312, as a virtual machines that serve as execution platforms for guest operating systems. Multiple instances of a variety of guest operating systems may thus share the hardware 302 resources.

In other embodiments, the hypervisor 304 runs directly on the server hardware 302 to control the hardware 302 and to manage guest domains, and is often referred to as a "bare metal" or "native" hypervisor. In another embodiment, the hypervisor 304 can be "embedded" and integrated into a processor on a separate chip in a multiple processor array. In a different embodiment, the hypervisor 304 can be "hosted" in so far as it runs as a distinct software layer above both the hardware 302 and the resident operating system of hardware layer.

In an embodiment, Dom0 306 is the first domain launched when the server 300 is booted, and can be used to create and configure all guest domains. In this embodiment, Dom0 has direct physical access to all hardware, and exports the simplified generic class devices to guest domains, e.g. Dom1-DomN. Rather than emulating physical devices, the hypervisor 304 exposes hardware 304 to VMIs through para-virtualized drivers. For example, the guest domain (e.g. Dom1) can view the network card as a generic network class device or the disk as a generic block class device. Dom0 306 then runs a device driver specific to each physical device in hardware 302 and interacts with the hardware 302 on behalf of the guest domains. For example, if a guest operating system in a guest domain attempts to access the generic network class device, the interaction is forwarded over a communication channel to a back-end drive in the Dom0 306 and the Dom0 306 interacts with the device driver for the physical device in the system. Dom0 306 can also delegate responsibility for a particular device to another domain.

With respect to the present system, there are several significant and invasive actions that can be taken on the VMI manager 106, e.g., (the Dom0 306 or the hypervisor 304 in an implementation similar to that illustrated in FIG. 3) once the VMIs are in a preferred operational state, such as when Dom1-N are quiesced, restarting, etc. This enables the service provider 102 to reboot the server 104 or take some other action such as to apply a significant software upgrade that could not otherwise be done without interrupting or otherwise affecting the execution of the guest domains. As described in more detail elsewhere, active guest domains Dom 1 308-DomN 312 can be monitored as to their resource use and the utilization profile can be used to determine when the server 300 itself can be rebooted, such as with the reboot of a bare metal hypervisor. Consequently, attributes of the guest domains can be monitored as described herein to determine when the significant invasive action can be taken.

One example of using the present system is to utilize the monitoring of the guest domains Dom1 308-DomN 312 to deploy software updates or other programs that are significantly invasive to the operation of the guest domains. The guest domains can be monitored from the Action Engine 116 running in Dom0 306 until they are either individually or collectively in a state where the update can be applied without significantly impacting the customer's use of the VMI.

In one embodiment, the control plane services can enable software to delivered to the server 104 hosting a VMI as well as other systems, and inform Dom0 306 whether the software needs to be immediately deployed or if the software can be opportunistically deployed. For example, if the customers for the network-accessible services have a guaranteed level of service, the VMI manager 106 will determine whether deployment of the software will impact these customers. If the action engine 116 determines that installation of the software may impact the customers, e.g. Dom1 308-DomN 312, then the action engine 116 can determine to install the software in an opportunistic fashion and wait until Dom1 308-DomN 312 are each in a state where deployment will not significantly impacting the customer's use of them. Thus, in performance of the invasive action (such as a software deployment or reboot) the control plane services can control the action completely; can allow the relevant hardware, such as server 300, and its corresponding local software, control the invasive action, e.g. reboot or power down when possible; or a combination of the control plane services and other hardware, such as server 300, can coordinate to effectively control and perform the invasive action. Moreover, the control plane services can make this determination at the time that the invasive action needs to occur, such as receiving a work order from the maintenance service 118, or receive a software update that needs to be rolled out to the servers 104.

Figure 4:
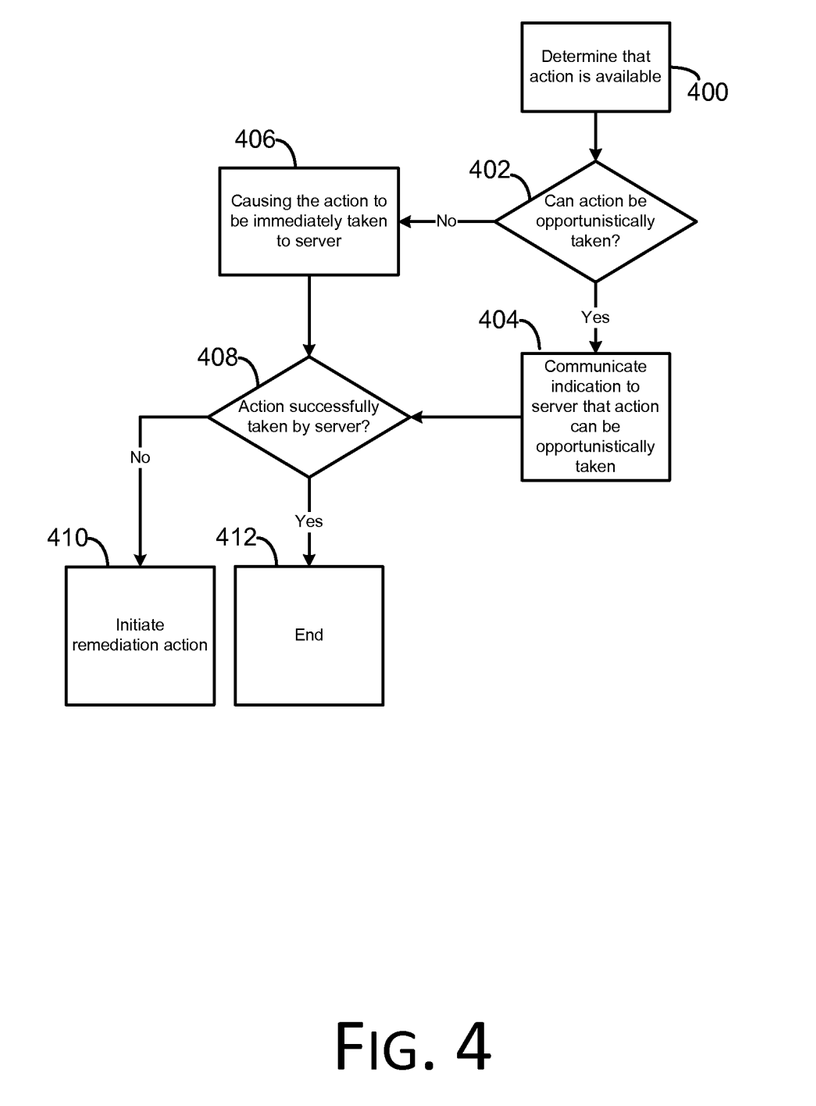
FIG. 4 illustrates one embodiment of a process executing on the VMI Manager to effect invasive actions at VMIs when the VMIs are in a predetermined operational state for the action to occur.
Figure 5:
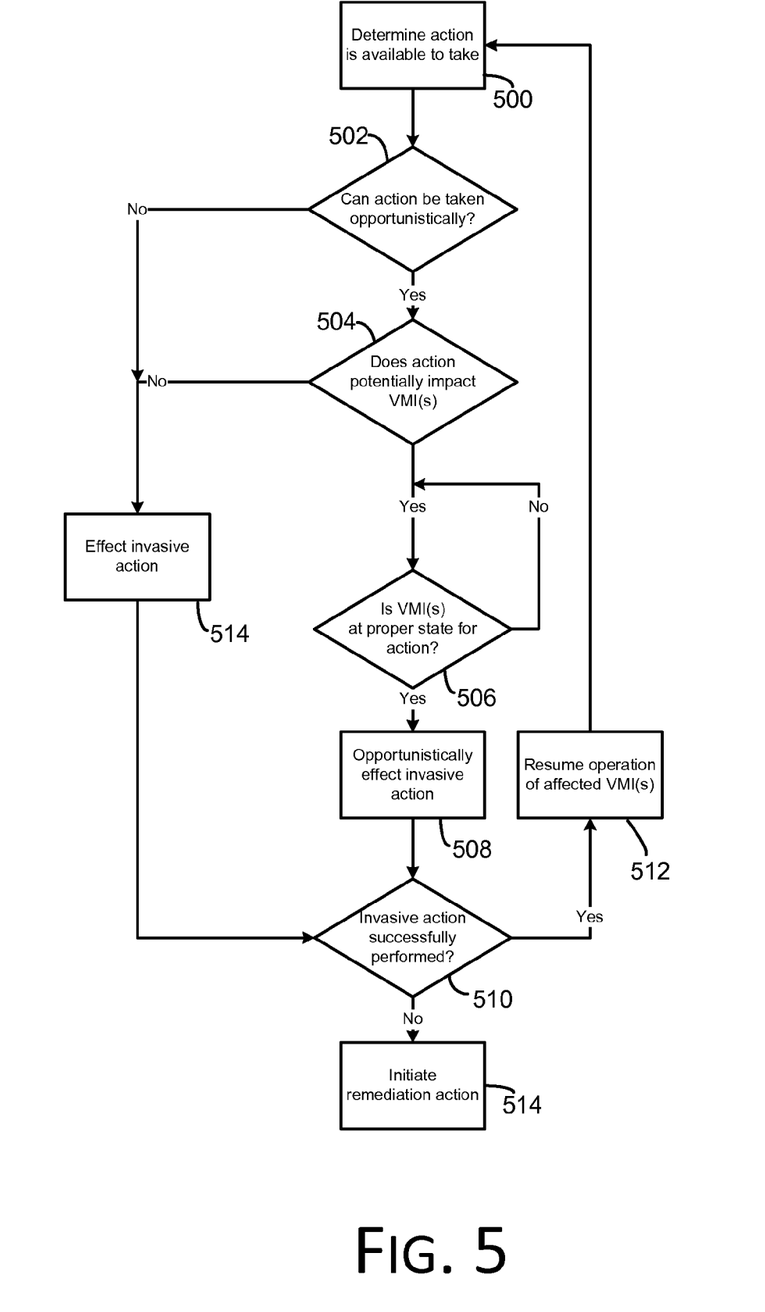
FIG. 5 illustrates one embodiment of a process executing at the VMI manager to periodically poll a maintenance service to learn of and effect any necessary invasive actions at the VMI.

FIGS. 4 and 5 are processes that the architecture of FIGS. 1, 2 and 3 may implement. These processes (as well as other processes described throughout) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to network-accessible computing platforms, the architectures and techniques are equally applicable to other computing environments and computing devices.

FIG. 4 illustrates an embodiment of a process that can be executing on a control plane server in a service provider environment 102. As shown by operation 400, the control plane server can determine that an action is available for one or more servers in the service provider environment 102 to initiate. In a specific example, suppose the control plane server is part of the deployment service 118 and has received a software package to deploy to servers 104. In response to the determination, and turning to operation 402, the control plane server can be configured to determine whether the action can be initiated opportunistically based on priority information associated with the action. For example, the control plane server can determine the servers affected by the action from information associated with the action and the action can be associated with priority information such as a rating (e.g., a score of 1-5, where a 1 may indicate that the action is critical and a 5 may indicate that the action is less important). Specific examples of an action that could be a 1 may be a patch to fix a security vulnerability in the VMI manager 106 and a 5 may be a routine restart of the server to return the server to a known state.

As shown by operation 404, supposing the action can be opportunistically taken, the control plane server can send a message to one or more servers indicating that an opportunistic action is available. Alternatively, as shown by operation 406, in the situation where the action needs to be immediately initiated, the control plane server can cause one or more servers to immediately initiate the action. For example, the control plane server could send a notification to the server to initiate the action. Alternatively, the control plane server can send a message to the server directing it to initiate a connection to the control plane server to receive the action. Operation 408 shows that the control plane server can determine whether the action was taken. For example, the control plane server can receive a signal from a technician or from the server indicating that the action was successfully completed. If it was successfully taken, the procedure ends, as shown by operation 412. Otherwise, as shown by operation 410 remediation action can be initiated.

Turning now to FIG. 5, it illustrates an operational procedure that a server configured to host virtual machines can execute, such as server 104 of FIG. 1. Turning to operation 500, it shows that the server 104 can determine whether an action is available. For example, the server 104 can communicate with a control plane server, such as a server operating as part of a deployment service 130, and determine whether an action is available. In a specific example, the server 104 can send a message to the deployment service 130 requesting information about available software or configuration and compare the received information to a data structure indicating the software or configuration on the server 104. In another configuration, the server 104 may receive a notification from a control plane server indicating that an action is available.

Continuing with the description of FIG. 5, operation 502 shows that the AE 116 can determine whether the action can be opportunistically initiated or if the action should be immediately initiated. In the instance where the action needs to be immediately initiated, the operational procedure moves to operation 514, where the invasive action can be initiated without regard as to whether it will negatively impact running VMIs. In an embodiment, this determination can be based at least in part on the priority rating of the action and priority rating of the server 104 and/or priority rating for each VMI that is currently running on the server 104. In an embodiment, the AE 116 can determine whether the priority rating of the action outweighs the priority rating of the server 104 and/or the priority of the hosted VMIs. In an example configuration, the AE 116 can be configured to immediately initiate the action when the priority rating of the action is greater than or equal to the priority rating of the server 104 and the priority ratings of the hosted VMIs.

In a specific example, suppose the action is a kernel update to the VMI manager 106 and its priority rating is 2 (indicating that the kernel update is high priority). Suppose the server 104 is one of many servers configured to host VMIs and it has a priority rating of 4 (indicating that this particular server is not particularly important in the fleet). One of skill in the art can appreciate that different servers can be associated with different priority ratings based on how important the server is in the fleet. In this example, the server 104 in this example may be hosting four VMIs, having priority ratings of 2, 3, 3, and 5. The priority ratings may indicate the server with a 2 belongs to a customer that pays for uninterruptable service, the two VMIs associated with 3s may belong to customers that pay the standard price for hosting VMIs, and the customer operating the VMI associated with a 5 may pay a reduced fee for an interruptible VMI. In this example, the AE 116 can receive the action and determine whether the priority ratings warrant immediately taking the action.

In an example configuration, the AE 116 can be configured to compare the priority rating associated with the action to the priority rating of the VMIs and the server 104. In the event that the priority rating of the action is the same or higher, the AE 116 can immediately effect the action. Thus, in the specific example above, the AE 116 may immediately initiate the action because the priority rating of the action (2) is the same or higher than the priority rating of the server 104 (4) and the priority ratings of the VMIs (2, 3, 3, and 5). Of course, the above configuration is only an example, and the AE 116 can be configured to use priority ratings to make the determination in ways other than the way described above. For example, the priority ratings can be weighted or can be adjusted over time or in response to other conditions. In addition, the AE 116 can be configured to analyze additional information such as a timestamp indicating the last time an action was initiated, whether an event is occurring at the service provider environment 102, whether the server is on a "white list" that indicates that actions must be authorized by an admin, etc.

Continuing with the description of FIG. 5, when the AE 116 determines that the action can be opportunistically taken, and shown by operation 504, the AE 116 can determine whether the action will potentially impact operation of hosted VMIs. Some actions, such as the installation of hardware or software may require a shutdown or reboot of the server 104 or the restart of some of the virtualization components within the VMI manager 106 (e.g., backend drivers 204, drivers for hardware 202, communication channels established between the VMI manager 106 and the VMIs, and/or certain kernel updates). Thus, the AE 116 can be configured to determine what operations the VMI manager 106 will have to perform to effect the action and determine whether the operations would impact the VMIs. For example, the AE 116 can analyze the action to determine whether a reboot or shutdown is needed, whether performance of the system or VMIs will be impacted while the action is being taken, or whether virtualization components need to be disabled to complete the action. In the instance that the action will not impact operation of the VMI (s), e.g., the action is an application of configuration or software that can be installed without a reboot, the operational procedure can move to operation 514 and the action can be immediately initiated.

In the instance that the AE 116 determines that the action is invasive, i.e., it may negatively affect operation of the VMIs, and the action can be taken opportunistically, the AE 116 can monitor the states of at least a portion of the VMIs to determine if the VMIs are in a state where initiation of the action may not adversely affect the VMIs, as shown by operation 506. For example, the AE 116 can create a data structure that lists the VMIs and periodically update the structure with state information for the VMIs. The AE 116 can monitor the data structure and in the event that at least a portion of the VMIs enter a specified state then the AE 116 can initiate the action. In an example embodiment, the state of the VMIs can be based on whether the VMI has entered a reboot procedure. For example, if the customer has initiated a reboot sequence for rebooting a VMI the server 104 can opportunistically use the VMI's reboot sequence to install software and reboot itself. In this example, an orderly shutdown and reboot sequence of a VMI can be used to install software in the VMI manager 106 and reboot the server 104 or restart virtualization components of the VMI manager 106 before allowing the VMI to reboot. Here, when the VMI shutsdown as part of a reboot operation the AE 116 can update the state information for the VMI to indicate that it has a pending reboot associated with it. In the same, or another embodiment, the state of the VMI can be based on I/O information that indicates that the VMI is in an idle state, such as a hibernation state, a sleep or standby state, or an idle-active state where it is simply not using I/O and use this information to update the data structure. For example, the VMI manager 106 can monitor the I/O patterns of the VMI, processor utilization, and memory accesses to determine a given VMI's state. That is, the AE 116 can determine whether the VMI is idle-active by monitoring its use of the hardware 302.

In an example embodiment, the AE 116 can be configured to use state information for VMIs that have certain priority ratings to determine when to initiate an invasive action. For example, certain VMIs may not have uninterruptable levels of service and the AE 116 may not take their state into consideration when determining when to initiate the invasive action. For example, the AE 116 can generate a data structure that lists the currently running VMIs along with priority ratings and drop the VMIs that have low priority ratings or priority ratings that indicate an interruptible level of service. The AE 116 can then monitor the state of the remaining VMIs and initiate the action when it is opportunistic to do for the monitored VMIs.

Continuing with the description of FIG. 5, operation 508 shows that the invasive action can be opportunistically initiated. For example, in an embodiment the AE 116 can use the data structure that lists at least a portion of the VMIs to determine whether they are in a state where the action can be opportunistically taken, e.g., a state where the VMIs are idle. In the instance that the VMIs enter such a state, the AE 116 can signal the VMI manager 106 to initiate the action. Here, the VMI manager 106 may execute a variety of operations dependent on the action. For example, if the VMI is initiating a reboot procedure, the VMI manager 106 can allow the VMIs to shutdown and then initiate the action prior to allowing the VMIs to reboot. In another example, in response to determining that the VMI is idle (e.g., the VMI is on but not using IO or CPU) the AE 116 stores the state of the VMIs to persistent storage, initiate the invasive action (e.g., install and restart components/reboot the server, shut down to have hardware maintenance performed, store or retrieve a virtual machine into or from storage, etc.), and return the VMI to the idle state.

Turning to operation 510, it shows that the AE 116 can make a determination as to whether the invasive action has successfully occurred. If confirmation has been received at decision 510, then the process iterates to decision 512 where the AE 116 resumes operation of affected VMIs. For example, the VMI AE 116 can resume the operation of any VMIs that were stopped and saved and/or allow VMIs that had shutdown as part of a reboot operation to reboot. Otherwise, if confirmation is not received at decision 508, then, as shown at operation 514, a remediation action can be initiated. For example, if the invasive action fails, e.g., software is not installed, then a trouble ticket can be issued to a data center technician to investigate the error. In addition, the VMIs that have been disrupted can be resumed or moved to a different server.

It should be noted that several functionalities are included in the process of FIG. 5 that are merely shown for illustration, such as the confirmation of the invasive action performance at decision 508. Other functionalities can likewise be added to the process of FIG. 4 to enhance the ability to update the AE 116.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system, comprising:
a processor coupled to a memory, the memory including instructions that upon execution by the processor cause the system to:
launch one or more virtual machine instances (VMIs) that are each accessible to one or more client devices across a network;
determine to initiate an action on at least one of the one or more VMIs, based at least in part on state information associated with the at least one of the one or more VMIs, wherein the initiation of the action results in a disruption of the at least one of the one or more VMIs;

compare (i) a priority rating of the action and (ii) a priority rating of the at least one of the one or more VMIs, wherein the priority rating of the action specifies a priority of the action relative to priorities of other actions, and the priority rating of the at least one of the one or more VMIs specifies a priority of the at least one of the one or more VMIs relative to priorities of one or more other VMIs;

in response to the priority rating of the at least one of the one or more VMIs being higher than the priority rating of the action, (i) cause a delay in initiating the action, (ii) initiate the action when the virtual machine transitions to an idle state, and (iii) cause a reboot of the system; and in response to the priority rating of the action being higher than the priority rating of the at least one of the one or more VMIs, initiate the action without causing the delay and without waiting for the virtual machine to transition to the idle state, and cause a reboot of the system.

2. The system of claim 1, wherein the memory further includes instructions that upon execution cause the system to:
install software in a VMI manager in conjunction with the reboot of the system prior to allowing one or more reboots to occur in the one or more VMIs.

3. The system of claim 1, wherein the instructions that upon execution cause the reboot of the system further comprise instructions that upon execution cause the system to:
cause the reboot of the system in response to determining that information associated with at least one VMI indicates that the VMI has non-guaranteed availability.

4. A system, comprising:
a processor coupled to a memory, the memory including instructions that upon execution by the processor cause the system to:
determine, by a virtual machine instance (VMI) manager hosting a virtual machine, that initiation of an action is required, wherein the initiation of the action results in a disruption of the virtual machine;
compare (i) a priority rating of the action and (ii) a priority rating of the virtual machine, wherein the priority rating of the action specifies a priority of the action relative to priorities of other actions, and the priority rating of the virtual machine specifies a priority of the virtual machine relative to priorities of one or more other virtual machines in the system;
in response to the priority rating of the virtual machine being higher than the priority rating of the action, (i) cause a delay in initiating the action, (ii) initiate the action when the virtual machine transitions to an idle state, and (iii) cause a reboot of the system; and
in response to the priority rating of the action being higher than the priority rating of the virtual machine, initiate the action without causing the delay and without waiting for the virtual machine to transition to the idle state, and cause a reboot of the system.

5. The system of claim 4, wherein prior to the initiation of the action, the virtual machine is hosted by a first server, and wherein the memory further comprises instructions that upon execution cause the system to:
migrate the virtual machine to a second server based on initiating the action.

6. The system of claim 4, wherein the memory further comprises instructions that upon execution cause the system to:
install software in the VMI manager.

7. The system of claim 4, wherein the memory further comprises instructions that upon execution cause the system to:
enable the virtual machine to reboot.

8. The system of claim 4, wherein the memory further comprises instructions that upon execution cause the system to:
restore the virtual machine from storage.

9. The system of claim 4, wherein the memory further comprises instructions that upon execution cause the system to:
store the virtual machine.

10. The system of claim 4, wherein the memory further comprises instructions that upon execution cause the system to:
affect operation of the virtual machine based at least in part on a determined rate of input/output operations for the virtual machine or a determined amount of central processor cycles used by the virtual machine.

11. The system of claim 4, wherein the action is at least one of:
software update to the VMI manager or maintenance of hardware of the system.

12. The system of claim 4, wherein the memory further comprises instructions that upon execution cause the system to:
receive a request from a management server to initiate the action.

13. The system of claim 4, wherein the memory further comprises instructions that upon execution by the processor cause the system to:
poll a management server to determine if an action is necessary for the hardware of the system.

14. A method, comprising:
determining, by a virtual machine instance (VMI) manager hosting a virtual machine in a system, that initiation of an action is required;
comparing (i) a priority rating of the action and (ii) a priority rating of the virtual machine, wherein the priority rating of the action specifies a priority of the action relative to priorities of other actions, and the priority rating of the virtual machine specifies a priority of the virtual machine relative to priorities of one or more other virtual machines in the system;
in response to the priority rating of the virtual machine being higher than the priority rating of the action, (i) causing a delay in initiating the action, (ii) initiating the action when the virtual machine transitions to an idle state, and (iii) causing a reboot of the system; and
in response to the priority rating of the action being higher than the priority rating of the virtual machine, initiating the action without causing the delay and without waiting for the virtual machine to transition to the idle state, and causing a reboot of the system.

15. The method of claim 14, further comprising migrating the virtual machine to a second server.

16. The method of claim 14, further comprising installing software in the VMI manager.

17. The method of claim 14, further comprising restoring the virtual machine from storage.

18. The method of claim 14, further comprising storing the virtual machine.

19. The method of claim 14, further comprising affecting operation of the virtual machine based at least in part on a determined rate of input/output operations for the virtual machine or a determined amount of central processor cycles used by the virtual machine.

20. The method of claim 14, wherein the action is at least one of:
a software update to the VMI manager or maintenance of hardware of the system.

21. The method of claim 14, further comprising receiving a request from a management server to initiate the action.

22. The method of claim 14, further comprising polling a management server to determine if an action is necessary for the hardware.

23. A non-transitory computer readable storage medium that contains instructions that, when executed by one or more processors, causes the one or more processors to:
determine, by a virtual machine instance (VMI) manager hosting a virtual machine in a system, that initiation of an action is required;
compare (i) a priority rating of the action and (ii) a priority rating of the virtual machine, wherein the priority rating of the action specifies a priority of the action relative to priorities of other actions, and the priority rating of the virtual machine specifies a priority of the virtual machine relative to priorities of one or more other virtual machines in the system;
in response to the priority rating of the virtual machine being higher than the priority rating of the action, (i) cause a delay in initiating the action, (ii) initiate the action when the virtual machine transitions to an idle state, and (iii) cause a reboot of the system; and
in response to the priority rating of the action being higher than the priority rating of the virtual machine, initiate the action without causing the delay and without waiting for the virtual machine to transition to the idle state, and cause a reboot of the system.

24. The non-transitory computer readable storage medium of claim 23, that when executed, further causes the one or more processors to migrate the virtual machine to a second server.

25. The non-transitory computer readable storage medium of claim 23, that when executed, further causes the one or more processors to install software in the VMI manager.

26. The non-transitory computer readable storage medium of claim 23, that when executed, further causes the one or more processors to restore the virtual machine from storage.

27. The non-transitory computer readable storage medium of claim 23, that when executed, further causes the one or more processors to store the virtual machine.

28. The non-transitory computer readable storage medium of claim 23, that when executed, further causes the one or more processors to affect operation of the virtual machine based at least in part on a determined rate of input/output operations for the virtual machine or a determined amount of central processor cycles used by the virtual machine.

* * * * *